(12) United States Patent
Verschuere

(10) Patent No.: US 11,254,764 B2
(45) Date of Patent: Feb. 22, 2022

(54) FLUORORPOLYMER COMPOSITIONS AND COATINGS

(71) Applicant: 3M INNOVATIVE PROPERTIES COMPANY, St. Paul, MN (US)

(72) Inventor: Alain Verschuere, Melsele (BE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 346 days.

(21) Appl. No.: 16/467,679

(22) PCT Filed: Dec. 8, 2017

(86) PCT No.: PCT/US2017/065288
§ 371 (c)(1),
(2) Date: Jun. 7, 2019

(87) PCT Pub. No.: WO2018/107017
PCT Pub. Date: Jun. 14, 2018

(65) Prior Publication Data
US 2019/0367651 A1 Dec. 5, 2019

(30) Foreign Application Priority Data
Dec. 8, 2016 (EP) .................................... 16203046

(51) Int. Cl.
| | | |
|---|---|---|
| *C08F 214/26* | (2006.01) | |
| *C09D 7/20* | (2018.01) | |
| *C08F 8/30* | (2006.01) | |
| *C08K 5/02* | (2006.01) | |
| *C08K 5/06* | (2006.01) | |
| *C08K 5/14* | (2006.01) | |
| *C09D 127/18* | (2006.01) | |

(52) U.S. Cl.
CPC ............ *C08F 214/262* (2013.01); *C08F 8/30* (2013.01); *C08K 5/02* (2013.01); *C08K 5/06* (2013.01); *C08K 5/14* (2013.01); *C09D 7/20* (2018.01); *C09D 127/18* (2013.01)

(58) Field of Classification Search
CPC .......... C08F 214/262; C08F 8/30; C09D 7/20; C09D 127/18; C08K 5/02; C08K 5/06; C08K 5/14
USPC ....................................................... 524/544
See application file for complete search history.

(56) References Cited

U.S. PATENT DOCUMENTS

| | | | |
|---|---|---|---|
| 3,332,907 A | 7/1967 | Angelo | |
| 4,349,650 A | 9/1982 | Krespan | |
| 6,258,907 B1 * | 7/2001 | Funaki | C08F 214/18 526/242 |
| 6,284,379 B1 | 9/2001 | Matsukura et al. | |
| 7,892,280 B2 | 2/2011 | Pathak | |
| 2005/0171257 A1 * | 8/2005 | Wakui | C08K 5/02 524/236 |
| 2013/0005879 A1 | 1/2013 | Nakano | |
| 2013/0040148 A1 | 2/2013 | Masuda et al. | |
| 2013/0129954 A1 * | 5/2013 | Lochhaas | C08F 214/222 428/36.9 |
| 2014/0305588 A1 | 10/2014 | Campbell et al. | |
| 2016/0185995 A1 * | 6/2016 | Mugisawa | B32B 27/285 428/422 |

FOREIGN PATENT DOCUMENTS

| | | |
|---|---|---|
| EP | 0540730 | 5/1993 |
| EP | 0928796 | 7/1999 |
| EP | 1997795 | 12/2008 |
| EP | 2617738 | 7/2013 |
| JP | 2014070101 | 4/2014 |
| WO | WO 96/022356 A1 | 7/1996 |
| WO | WO 2002-004534 | 1/2002 |
| WO | WO 2008-094758 | 8/2008 |

OTHER PUBLICATIONS

International Search Report for PCT International Application No. PCT/US2017/065288, dated Feb. 1, 2018, 4 pages.

* cited by examiner

*Primary Examiner* — Michael M. Bernshteyn
(74) *Attorney, Agent, or Firm* — Thomas M. Spielbauer

(57) ABSTRACT

A composition comprising at least one fluoropolymer and at least one solvent, wherein the solvent comprises a branched, partially fluorinated ether and wherein the partially fluorinated ether corresponds to the formula:

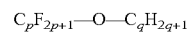

$C_pF_{2p+1}-O-C_qH_{2q+1}$ wherein q is an integer from 1 to and 5 and p is an integer from 5 to 11; and wherein the fluoropolymer is a copolymer comprising at least 90% by weight (based on the total weight of the polymer, which is 100% by weight) of units derived from tetrafluoroethene (TFE) and one or more perfluorinated alkyl ethers selected from ethers corresponding to the general formula

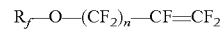

$R_f-O-(CF_2)_n-CF=CF_2$ wherein n is 1 in which case the ether is an allyl ether, or 0 in which case the ether is a vinyl ether and $R_f$ represents a perfluoroalkyl residue which may be interrupted once or more than once by an oxygen atom. Also provided are methods of preparing the compositions and methods for coating substrate with the compositions.

15 Claims, No Drawings

FLUORORPOLYMER COMPOSITIONS AND COATINGS

CROSS REFERENCE TO RELATED APPLICATIONS

This application is a national stage filing under 35 U.S.C. 371 of PCT/US2017/065288, filed Dec. 8, 2017, which claims the benefit of European Application No. 16203046.4, filed Dec. 8, 2016, the disclosure of which is incorporated by reference in their entirety herein.

FIELD

The present disclosure relates to fluoropolymer compositions in particular suitable for coating substrates, coated articles and methods of making the compositions and the coatings.

BACKGROUND

Fluoropolymers, in particular highly fluorinated polymers, such as polymers with a high content of tetrafluoroethene (TFE), have achieved outstanding commercial success due to their chemical and thermal inertness. They are used in a wide variety of applications in which severe environments such as exposure to high temperatures and/or aggressive chemicals are encountered. Typical end use applications of the polymers include but are not limited to seals for engines, seals in oil-well drilling devices, and sealing elements for industrial equipment that operates at high temperatures or in a chemically aggressive environment.

The outstanding properties of the highly fluorinated polymers are largely attributable to the stability and inertness of the copolymerized perfluorinated monomer units that make up the major portion of the polymer backbones in these compositions. Such monomers include tetrafluoroethene and other perfluorinated alpha-olefins.

However, highly fluorinated polymers, in particular perfluoroelastomers, are difficult to dissolve in solvents and coating compositions are difficult to prepare. Therefore, articles containing these polymers are typically prepared by molding the polymers. In international patent application WO2008/094758 A1 certain perfluorinated liquids are reported to dissolve perfluoroelastomers and were suggested for making coating compositions.

There is a need to provide further compositions with dissolved highly fluorinated polymers for coating substrates.

SUMMARY

Therefore, in one aspect there is provided a composition comprising at least one fluoropolymer and at least one solvent, wherein the solvent comprises a branched, partially fluorinated ether and wherein the partially fluorinated ether corresponds to the formula:

wherein Rf is a selected from perfluorinated and partially fluorinated alkyl groups that may be interrupted once or more than once by an ether oxygen and R is selected from partially fluorinated and non-fluorinated alkyl groups; and wherein the fluoropolymer is a copolymer comprising at least 90% by weight (based on the total weight of the polymer, which is 100% by weight) of units derived from tetrafluoroethene (TFE) and one or more perfluorinated alkyl ethers corresponding to the general formula

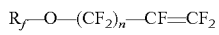

wherein n is 1 or 0 and $R_f$ represents a perfluoroalkyl residue which may be interrupted once or more than once by an oxygen atom.

In another aspect there is provided a method of making the above composition comprising dissolving the fluoropolymer in the solvent.

In a further aspect there is provided an article comprising a coating obtained from the above composition.

In yet another aspect there is provided a method of making a coating comprising
(i) Applying a composition as above to a substrate;
(ii) removing the solvent and, optionally when the fluoropolymer is curable, subjecting the composition to curing, wherein the optional curing step may be carried out after, simultaneously with or prior to removing the solvent.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein describing a physical property or a concentration is intended to include all values from the lower value to the upper value of that range and including the endpoints. For example, a concentration range of from 1% to 50% is intended to be an abbreviation and to expressly disclose the values between the 1% and 50%, such as, for example, 2%, 40%, 10%, 30%, 1.5%, 3.9% and so forth.

Unless indicated otherwise the total amounts of ingredients of a composition expressed as percentage by weight of that composition add up to 100%, i.e. the total weight of the composition is always 100% by weight unless stated otherwise.

Unless indicated otherwise the total amounts of ingredients of a composition expressed as percentage by mole of that composition add up to 100%, i.e. the total amount of moles of the composition is always 100% by mole unless stated otherwise.

As used herein the term 'partially fluorinated alkyl' means an alkyl group of which some but not all hydrogens bonded to the carbon chain have been replaced by fluorine. For example, an $F_2HC-$, or an $FH_2C-$ group is a partially fluorinated methyl group. Alkyl groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example residue of the formula $F_2ClC-$ or $FHClC-$ are also partially fluorinated alkyl residues.

A 'partially fluorinated ether' as used herein is an ether containing at least one partially fluorinated group, or an ether that contains one or more perfluorinated groups and at least one non-fluorinated or at least one partially fluorinated group. For example, $F_2HC-O-CH_3$, $F_3C-O-CH_3$, $F_2HC-O-CFH_2$, and $F_2HC-O-CF_3$ are examples of partially fluorinated ethers. Ethers groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example ethers of the formula $F_2ClC-O-CF_3$ or $FHClC-O-CF_3$ are also partially fluorinated ethers.

The term 'perfluorinated alkyl' or 'perfluoro alkyl' is used herein to describe an alkyl group where all hydrogen atoms bonded to the alkyl chain have been replaced by fluorine atoms. For example, $F_3C-$ represents a perfluoromethyl group.

A 'perfluorinated ether' is an ether of which all hydrogen atoms have been replaced by fluorine atoms. An example of a perfluorinated ether is $F_3C-O-CF_3$.

Fluoropolymer Compositions

The fluoropolymer compositions provided herein are suitable for coating substrates and may be as coating compositions, i.e. compositions for coating substrates. They may be formulated to have different viscosities depending on solvent and fluoropolymer content and the presence or absence of optional additives. They typically contain or are solutions of fluoropolymers and may be in the form of liquids or pastes. Nevertheless, the compositions may contain dispersed or suspended materials but these materials preferably are additives and not fluoropolymers of the type as described herein. Preferably, the compositions are liquids and more preferably they are solutions containing one or more fluoropolymer as described herein dissolved in a solvent as described herein.

The fluoropolymer compositions provided herein are suitable for coating substrates and may be adjusted in their viscosity to allow them to be applied by different coating methods, including, but not limited to spray coating or printing (for example but not limited to ink-printing, 3D-printing, screen printing), painting, impregnating, roller coating, bar coating, dip coating and solvent casting.

The fluoropolymer compositions may comprise, for example, from 0.01 to 55% by weight or from 0.01 to 45% by weight of fluoropolymer (based on the weight of the total composition), for example from 5 to 50% by weight or from 10 to 45% by weight.

The fluoropolymer compositions may be liquids. The liquids may have, for example, a viscosity of less than 2,000 mPas at room temperature (20° C.+/−2° C.). In one embodiment the compositions are pastes. The pastes may have, for example, a viscosity of from 2,000 to 100.000 mPas at room temperature (20° C.+/−2° C.).

The fluoropolymers for the fluoropolymer compositions according to the present disclosure are copolymers and comprise predominantly, or exclusively, repeating units derived from two or more perfluorinated comonomers. The comonomers include tetrafluoroethene (TFE) and one or more unsaturated perfluorinated alkyl ethers selected from the general formula:

$$R_f-O-(CF_2)_n-CF=CF_2$$

wherein n is 1 (allyl ether) or 0 (vinyl ether) and Rf represents a perfluoroalkyl residue which may be interrupted once or more than once by an oxygen atom. Rf may contain up to 10 carbon atoms, e.g. 1, 2, 3, 4, 5, 6, 7, 8, 9 or 10 carbon atoms. Preferably Rf contains up to 8, more preferably up to 6 carbon atoms and most preferably 3 or 4 carbon atoms. In one embodiment Rf has 3 carbon atoms. In another embodiment Rf has 1 carbon atom. Rf may be linear, branched and it may contain or not contain a cyclic unit. Specific examples of Rf include residues with one or more ether functions including but not limited to:

—$(CF_2)$—O—$C_3F_7$,

—$(CF_2)_2$—O—$C_2F_5$,

—$(CF_2)_{r3}$—O—$CF_3$,

—$(CF_2-O)$—$C_3F_7$,

—$(CF_2-O)_2$—$C_2F_5$,

—$(CF_2-O)_3$—$CF_3$,

—$(CF_2CF_2-O)$—$C_3F_7$,

—$(CF_2CF_2-O)_2$—$C_2F_5$,

—$(CF_2CF_2-O)_3$—$CF_3$,

Other specific examples for Rf include residues that do not contain an ether function and include but are not limited to —$C_4F_9$, —$C_3F_7$, —$C_2F_5$, —$CF_3$, wherein the $C_4$ and $C_3$ residues may be branched or linear, but preferably are linear.

Specific examples of suitable perfluorinated alkyl vinyl ethers (PAVE's) and perfluorinated alkyl allyl ethers (PAAE's) include but are not limited to perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_2=CF-O-CF_2-O-C_2F_5$, $CF_2=CF-O-CF_2-O-C_3F_7$, $CF_3-(CF_2)_2-O-CF(CF_3)-CF_2-O-CF(CF_3)-CF_2-O-CF=CF_2$ and their allyl ether homologues. Specific examples of allyl ethers include $CF_2=CF-CF_2-O-CF_3$, $CF_2=CF-CF_2-O-C_3F_7$, $CF_2CF-CF_2-O-(CF_3)_3-O-CF_3$.

Further examples include but are not limited to the vinyl ether described in European patent application EP 1,997,795 B1.

Perfluorinated ethers as described above are commercially available, for example from Anles Ltd. St. Petersburg, Russia and other companies or may be prepared according to methods described in U.S. Pat. No. 4,349,650 (Krespan) or European Patent 1,997,795 or by modifications thereof as known to the skilled person.

The fluoropolymers according to the present disclosure are copolymers and comprise predominantly or exclusively repeating units derived from perfluorinated comonomers including tetrafluoroethene (TFE) and one or more of the unsaturated perfluorinated alkyl ethers described above. "Predominantly" as used herein means at least 90% by weight based on the total weight of the polymer, preferably at least 95% by weight, or at least 97% by weight. The fluoropolymers may contain at least 50% by weight of units derived from TFE. The molar ratio of units derived from TFE to the perfluorinated alkly ethers described above may be, for example, from 1:1 to 4:1.

The fluoropolymers may be thermoplastic but, in a preferred embodiment, the fluoropolymer is an elastomer. Elastomers typically are amorphous. They may have a glass transition temperature (Tg) of less than 26° C., or less than 20° C., less than 0° C., and for example from −40° C. to 20° C., or −50° C. and 15° C. or between −55° C. and 10° C. The fluoroelastomers may typically have a Mooney viscosity (ML 1+10 at 121° C.) of from about 2 to about 150, for example from 10 to t 100, or from 20 to 70.

The fluoropolymer preferably is a curable elastomer and contains one or more cure-sites. Cure sites are functional groups that react in the presence of a curing agent or a curing system to cross-link the polymers. The cure sites are typically introduced by copolymerizing cure-site monomers, which are functional comonomers already containing the cure sites or precursors thereof.

In a particularly preferred embodiment the curable fluoroelastomer is a curable perfluoroelastomer, for example a perfluoroelastomer of the FFKM-type as known in the art. A perfluoroelastomer comprises repeating units exclusively derived from the perfluorinated comonomers but may contain units derived from cure-site monomers, and modifying monomers if desired. The cure-site monomers and modifying monomers may be partially fluorinated, not fluorinated or perfluorinated and preferably are perfluorinated. The perfluoroelastomers may contain between 69 and 73% fluorine by weight (based on the total amount of polymer). The fluorine content may be achieved by selecting the comonomers and their amounts accordingly. It can be determined as nominal fluorine content by determining the amount of monomers and calculating their fluorine content by excluding contributions to the fluorine content from other components like, for example, cure site monomers, modifiers and chain transfer agents (CTA's).

The curable fluoroelastomer compositions may comprise one or more curing systems for curing the curable fluoroelastomers as described herein. However, protective coatings may be achieved already by applying the fluoropolymers to the substrate and removing the solvent, for example by drying. Curing may not be required to achieve a sufficient protective coating but may be required to provide or increase the mechanical properties of the coating. Therefore, in one embodiment of the present disclosure, the fluoropolymer compositions do not comprise a curing agent or curing system. In another embodiment the fluoropolymer compositions contain a curable fluoroelastomer and comprise a curing agent or curing system. The fluoropolymer composition may also be cured using actinic irradiation, for example but not limited to e-beam curing. No curing agents or curing systems may be required for curing the fluoropolymer compositions by actinic irradiation, e.g. e-beam irradiation but curing agents or curing systems may be added, for example to allow for dual cure systems.

The comonomers are used in amounts to generate a curable fluoropolymer with the properties described herein, for example having a glass transition temperature (Tg) as described above, for example of less than 0° C. and/or a fluorine content of between 69 and 73% by weight (based on the total weight of the polymer).

Typically, the perfluoroelastomer contain repeating units exclusively derived from TFE and one or more PAVE, PAAE or a combination thereof. The copolymerized perfluorinated ether units may constitute from about 10 to about 50 mol %, preferably from about 15 to about 35 mol % of total monomer units present in the polymer.

The fluoropolmyers may have a monomodal or bi-modal or multi-modal weight distribution. The fluoropolymers may or may not have a core-shell structure. Core-shell polymers are polymers where towards the end of the polymerization, typically after at least 50% by mole of the comonomers are consumed, the comonomer composition or the ratio of the comonomers or the reaction speed is altered to create a shell of different composition.

The fluoropolymers can be prepared by methods known in the art, such as bulk, suspension, solution or aqueous emulsion polymerisation. For example, the polymerisation process can be carried out by free radical polymerisation of the monomers alone or as solutions, emulsions, or dispersions in an organic solvent or water. Seeded polymerizations may or may not be used. Curable fluoroelastomers that can be used also include commercially available fluoroelastomers, in particular perfluoroelastomers.

The curable fluoropolymers used may typically have an onset of cure (Ts2) of less than 1 minute at 180° C.

Cure Sites and Cure Site Monomers

The curable fluoropolymers provided herein further comprise at least one or more cure sites. The cure sites react with a curing agent or a curing system by which the polymers are cross-linked (cured). The curable elastomers may be, for example, peroxide curable and contain cure sites that are reactive to a peroxide curing system. The cure sites may be introduced into the polymer by using cure site monomers, i.e. functional monomers as will be described below, functional chain-transfer agents and starter molecules. Instead or in addition to peroxide-curable cure sites, the fluoroelastomers may contain cure sites that are reactive to other curing systems. An example widely used in the art include cure sites containing nitrile or nitrile groups. Such cure sites are reactive, for example, to curing systems that generate ammonia, as well as peroxide cure.

Suitable cure sites comprise iodine atoms. Iodine-containing cure site end groups can be introduced by using an iodine-containing chain transfer agent in the polymerization. Iodine-containing chain transfer agents will be described below in greater detail. In addition halogenated redox systems as described below may be used to introduce iodine end groups.

The curable fluoroelastomers may also contain cure sites in the back bone or as pending groups in addition or as an alternative to the cure sites at a terminal position. Cure sites within the polymer backbone can be introduced by using a suitable cure-site monomer. Cure site monomers are monomers containing one or more functional groups that can act as cure sites or, less preferred, contain a precursor that can be converted into a cure site.

In addition to iodine cures sites, other cure sites may also be present, for example Br-containing cure sites or cure sites containing one or more nitrile groups. Br-containing cure sites may be introduced by Br-containing cure-site monomers. Nitrile-containing cure sites are typically introduced by cure site monomers containing a nitrile group.

Examples of cure-site comonomers include for instance:
(a) bromo- or iodo-(per)fluoroalkyl-(per)fluorovinylethers, for example including those having the formula:

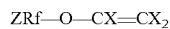

ZRf—O—CX=CX$_2$ wherein each X may be the same or different and represents H or F, Z is Br or I, Rf is a C1-C12 (per)fluoroalkylene, optionally containing chlorine and/or ether oxygen atoms. Suitable examples include ZCF$_2$—O—CF=CF$_2$, ZCF$_2$CF$_2$—O—CF=CF$_2$, ZCF$_2$CF$_2$CF$_2$—O—CF=CF$_2$, CF$_3$CFZCF$_2$—O—CF=CF$_2$ or ZCF$_2$CF$_2$—O—CF$_2$CF$_2$CF$_2$—O—CF=CF$_2$ wherein Z represents Br of I; and (b) bromo- or iodo perfluoroolefins such as those having the formula:

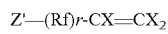

Z'—(Rf)r-CX=CX$_2$ wherein each X independently represents H or F, Z' is Br or I, Rf is a $C_1$-$C_{12}$ perfluoroalkylene, optionally containing chlorine atoms and r is 0 or 1; and (c) non-fluorinated bromo and iodo-olefins such as vinyl bromide, vinyl iodide, 4-bromo-1-butene and 4-iodo-1-butene.

Specific examples include but are not limited to compounds according to (b) wherein X is H, for example compounds with X being H and Rf being a C1 to C3 perfluoroalkylene. Particular examples include: bromo- or iodo-trifluoroethene, 4-bromo-perfluorobutene-1,4-iodo-perfluorobutene-1, or bromo- or iodo-fluoroolefins such as 1-iodo,2,2-difluoroethene, 1-bromo-2,2-difluoroethene, 4-iodo-3,3,4,4,-tetrafluorobutene-1 and 4-bromo-3,3,4,4-tetrafluorobutene-1; 6-iodo-3,3,4,4,5,5,6,6-octafluorohexene-1.

Typically, the amount of iodine or bromine or their combination in the fluoropolymer is between 0.001 and 5%, preferably between 0.01 and 2.5%, or 0.1 to 1% or 0.2 to 0.6% by weight with respect to the total weight of the fluoropolymer. In one embodiment the curable fluoropolymers contain between 0.001 and 5%, preferably between 0.01 and 2.5%, or 0.1 to 1%, more preferably between 0.2 to 0.6% by weight of iodine based on the total weight of the fluoropolymer.

In addition to the I- and/or Br-cure sites described above, or as an alternative, the curable fluoropolymers may contain nitrile-containing cure sites. Nitrile-containing cure sites may be reactive to other cure systems for example, but not limited to, bisphenol curing systems, peroxide curing systems or triazine curing systems. Examples of nitrile containing cure site monomers correspond to the following formulae:

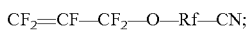

$CF_2$=CF—$CF_2$—O—Rf—CN;

$CF_2$=CFO$(CF_2)_r$CN;

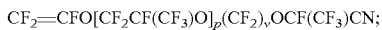

$CF_2$=CFO[$CF_2$CF($CF_3$)O]$_p$($CF_2$)$_v$OCF($CF_3$)CN;

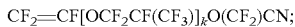

$CF_2$=CF[OCF$_2$CF($CF_3$)]$_k$O($CF_2$)$_u$CN;

wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include but are not limited to perfluoro (8-cyano-5-methyl-3,6-dioxa-1-octene), $CF_2$=CFO($CF_2$)$_5$CN, and $CF_2$=CFO($CF_2$)$_3$OCF($CF_3$)CN.

The amount of units derived from cure site comonomers depends on the desired cross-linking density. Cure site monomers may be used in amounts of 0 to 10% by weight, typically in amounts of less than 10% by weight or even less than 5% by weight based on the total amount of comonomers used.

The fluoroelastomers may also be of dual cure type. They may also contain different cure sites that are reactive to different curing systems.

It is contemplated that by using halogenated chain transfer agents terminal cure sites may be introduced. Chain transfer agents are compounds capable of reacting with the propagating polymer chain and terminating the chain propagation. Examples of chain transfer agents reported for the production of fluoroelastomers include those having the formula Rh, wherein R is an x-valent fluoroalkyl or fluoroalkylene radical having from 1 to 12 carbon atoms, which may be interrupted by one or more ether oxygens and may also contain chlorine and/or bromine atoms. R may be Rf and Rf may be an x-valent (per)fluoroalkyl or (per)fluoroalkylene radical that may be interrupted once or more than once by an ether oxygen. Examples include alpha-omega diiodo alkanes, alpha-omega diiodo fluoroalkanes, and alpha-omega diiodoperfluoroalkanes, which may contain one or more catenary ether oxygens. "Alpha-omega" denotes that the iodine atoms are at the terminal positions of the molecules. Such compounds may be represented by the general formula X—R—Y with X and Y being I and R being as described above. Specific examples include di-iodomethane, alpha-omega (or 1,4-) diiodobutane, alpha-omega (or 1,3-) diiodopropane, alpha-omega (or 1,5-) diiodopentane, alpha-omega (or 1,6-) diiodohexane and 1,2-diiodoperfluoroethane. Other examples include fluorinated di-iodo ether compounds of the following formula:

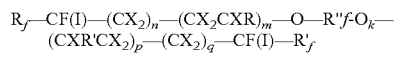

R$_f$—CF(I)—(CX$_2$)$_n$—(CX$_2$CXR)$_m$—O—R''$_f$-O$_k$—
(CXR'CX$_2$)$_p$—(CX$_2$)$_q$—CF(I)—R'$_f$ wherein X is independently selected from F, H, and Cl; R$_f$ and R'$_f$ are independently selected from F and a monovalent perfluoroalkane having 1-3 carbons; R is F, or a partially fluorinated or perfluorinated alkane comprising 1-3 carbons; R''$_f$ is a divalent fluoroalkylene having 1-5 carbons or a divalent fluorinated alkylene ether having 1-8 carbons and at least one ether linkage; k is 0 or 1; and n, m, and p are independently selected from an integer from 0-5, wherein, n plus m at least 1 and p plus q are at least 1.

Curing Systems

The fluoropolymer compositions provided herein may contain one or more curing system for curing the curable fluoroelastamer, including for example a peroxide cure system. Other cure systems include, but are not limited to nitrogen-based cure systems as will be described below.

The peroxide cure systems typically include an organic peroxide. The peroxide will cause curing of the fluorinated polymer to form a cross-linked (cured) fluoropolymer when activated. Suitable organic peroxides are those which generate free radicals at curing temperatures. Examples include dialkyl peroxides or bis(dialkyl peroxides), for example. a di-tertiarybutyl peroxide having a tertiary carbon atom attached to the peroxy oxygen. Specific examples include 2,5-dimethyl-2,5-di(tertiarybutylperoxy)hexyne-3 and 2,5-dimethyl-2,5-di(tertiarybutylperoxy)hexane; dicumyl peroxide, dibenzoyl peroxide, tertiarybutyl perbenzoate, alpha, alpha'-bis(t-butylperoxy-diisopropylbenzene), and di[1,3-dimethyl-3-(t-butylperoxy)-butyl]carbonate. Generally, about 1 to 5 parts of peroxide per 100 parts of fluoropolymer may be used.

The curing agents may also be present on carriers, for example silica containing carriers. A peroxide cure system may also include in addition one or more coagent. Typically, the coagent includes a polyunsaturated compound which is capable of cooperating with the peroxide to provide a useful cure. These coagents may typically be added in an amount between 0.1 and 10 parts per hundred parts fluoropolymer, preferably between 2 and 5 parts per hundred parts fluoropolymer. Examples of useful coagents include triallyl cyanurate; triallyl isocyanurate; triallyl trimellitate; tri(methylallyl)isocyanurate; tris(diallylamine)-s-triazine; triallyl phosphite; (N,N')-diallyl acrylamide; hexaallyl phosphoramide; (N,N,N,N)-tetraalkyl tetraphthalamide; (N,N,N',N-tetraallylmalonamide; trivinyl isocyanurate; 2,4,6-trivinyl methyltrisiloxane; N,N'-m-phenylenebismaleimide; diallylphthalate and tri(5-norbornene-2-methylene)cyanurate. Particularly useful is triallyl isocyanurate.

Suitable curing systems for nitrile cure sites are known in the art and include, but are not limited to, amidines, amidoximes and others described in WO2008/094758 A 1, incorporated herein by reference in appropriate part. They may include nitrogen-containing nucleophilic compounds selected from heterocyclic secondary amines; guanidines; compounds which decompose in-situ at a temperature between 40° C. and 330° C. to produce a guanidine; compounds which decompose in-situ at a temperature between 40° C. and 330° C. to produce a primary or secondary amine; nucleophilic compounds of the formula $R_1$—NH—$R_2$, wherein $R_1$ is H—, a $C_1$-$C_{10}$ aliphatic hydrocarbon group, or an aryl group having hydrogen atoms in the alpha positions, $R_2$ is a $C_1$-$C_{10}$ aliphatic hydrocarbon group, an aryl group having hydrogen atoms in the alpha positions, —CONH$R_3$, —NHCO$_2R_3$, or —OH', and $R_3$ is a $C_1$-$C_{10}$, aliphatic hydrocarbon group: and substituted amidines of the formula HN=C$R_4$N$R_5R_6$, wherein $R_4$, $R_5$, $R_6$ are independently H—, alkyl or aryl groups and wherein at least one of $R_4$, $R_5$ and Re is not H—.

As used herein, "heterocyclic secondary amines" refers to aromatic or aliphatic cyclic compounds which have at least one secondary amine nitrogen contained within the ring. Such compounds include, for example, pyrrole, imidazole, pyrazole, 3-pyrroline, and pyrrolidine.

Guanidines included in this disclosure are compounds derived from guanidine, i.e. compounds which contain the radical, —NHCNHNH—, such as, but not limited to, diphenylguanidine, diphenylguanidine acetate, aminobutylguanidine, biguanidine, isopentylguanidine, di-o-tolylguanidine, o-tolylbiguanide, and triphenyiguanidine.

Compounds which decompose in-situ at a temperature between 40° C. and 330° C. to produce either a primary or secondary amine include, but are not limited to, di- or poly-substituted ureas (e.g. 1,3-dimethyl urea); N-alkyl or -dialkyl carbamates (e.g. N-(tert-butyloxycarbonyl)propylamine), di- or poly-substituted thioureas (e.g. 1,3-dimethyl-thiourea); aldehyde-amine condensation products (e.g. 1,3,5-trimethylhexahydro-1,3,5-triazine); N,N"-dialkyl phthalamide derivatives (e.g. dimethylphthalamide); and amino acids.

Illustrative examples of nucleophilic compounds of formula $R_1$—NH—$R_2$ include, but are not limited to, aniline, t-butylcarbazate and $C_1$-$C_{10}$ aliphatic primary amines (such as methylamine). Illustrative examples of substituted amidines of the formula HN=C$R_4$N$R_5R_6$ include benzamidine and N-phenylbenzamidine.

It is believed that most of these nucleophilic compounds act as curing agents by catalyzing the trimerization of polymer chain bound nitrile groups to form triazine rings, thus crosslinking the fluoroelastomer.

The nitrogen-containing nucleophilic compounds may be used alone or in combination with each other or in combination with other curatives. When used in combination with other curatives the level at which the nitrogen-containing nucleophilic compound may be present is generally from 0.01 to 5 parts nucleophilic compound per 100 parts perfluoroelastomer. Preferably 0.05-3.0 parts nucleophilic compound per 100 parts perfluoroelastomer may be used. Curable perfluoroelastomer compositions containing above 5 parts nucleophilic compound per 100 parts perfluoroelastonier may generally be scorchy and may result in compositions of high Mooney viscosity.

Other curatives that may be used alone or in combination with one or more of the nitrogen-containing curatives described above and are capable of crosslinking the perfluoroelastomer include organotin compounds or certain amino group-containing benzene compounds. Suitable organotin compounds include allyl-, propargyl-, triphenyl- and allenyl tin curatives. Another type of curatives includes bis(aminophenols) and bis(aminothiophenols) of the formulae

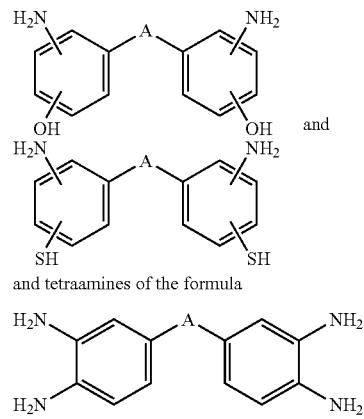

and tetraamines of the formula

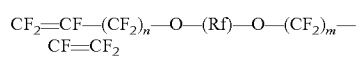

where A is $SO_2$, O, CO, alkyl of 1-6 carbon atoms, perfluoroalkyl of 1-10 carbon atoms, or a carbon-carbon bond linking the two aromatic rings. The amino and hydroxyl groups in formulas XI and XII above, are interchangeably in the meta and para positions with respect to the group A. Preferably, the second curing agent is a compound selected from the group consisting of 2,2-bis[3-amino-4-hydroxyphenyl]hexafiuoropropane; 4,4'-sulfonylbis(2-aminophenol); 3,3'-diaminobenzidine, and 3,3',4,4'-tetraaminobenzophenone. The first of these curing agents are referred to as diaminobisphenol AF. The curing agents can be prepared as disclosed in U.S. Pat. No. 3,332,907 to Angelo. Diaminobisphenol AF can be prepared by nitration of 4,4'-[2,2,2-trifluoro-1-(trifluoromethyl)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst.

An appropriate level of curatives can be selected by considering cure properties, for example the time to develop maximum moving die rheometer (MDR) torque and minimum Mooney scorch of the curable compositions. The optimum level will depend on the particular combination of perfluoroelastomer and curative and the desired properties of the cured elastomer.

Modifying Monomers:

The fluoropolymers may or may not contain units derived from at least one modifying monomer. The modifying monomers may introduce branching sites into the polymer architecture. Typically, the modifying monomers are bisolefins, bisolefinic ethers or polyethers. The bisolefins and bisolefinic (poly)ethers may be perfluorinated, partially fluorinated or non-fluorinated. Preferably they are perfluorinated. Suitable perfluorinated bisolefinic ethers include those represented by the general formula:

$$CF_2=CF-(CF_2)_n-O-(Rf)-O-(CF_2)_m-CF=CF_2$$

wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms. A particular suitable perfluorinated bisolefinic ether is a di-vinylether represented by the formula:

$$CF_2=CF-O-(CF_2)_n-O-CF=CF_2$$

wherein n is an integer between 1 and 10, preferably 2 to 6, e.g. n may be 1, 2, 3, 4, 5, 6 or 7. More preferably, n represents an uneven integer, for example 1, 3, 5 or 7.

Further specific examples include bisolefinic ethers according the general formula $$CF_2=CF-(CF_2)_n-O-(CF_2)_p-O-(CF_2)_m-CF=CF_2$$

wherein n and m are independently either 1 or 0 and p is an integer from 1 to 10 or 2 to 6. For example n may be selected to represent 1, 2, 3, 4, 5, 6 or 7, preferably, 1, 3, 5 or 7.

Further suitable perfluorinated bisolefinic ethers can be represented by the formula $$CF_2=CF-(CF_2)_p-O-(R_{af}O)_n(R_{bf}O)_m-(CF_2)_q-CF=CF_2$$

wherein $R_{af}$ and $R_{bf}$ are different linear or branched perfluoroalkylene groups of 1-10 carbon atoms, in particular 2 to 6 carbon atoms, and which may or may not be interrupted by one or more oxygen atoms. $R_{af}$ and/or $R_{bf}$ may also be perfluorinated phenyl or substituted phenyl groups; n is an integer between 1 and 10 and m is an integer between 0 and 10, preferably m is 0. p and q are independent from each other either 1 or 0.

Such modifiers can be prepared by methods known in the art and are commercially available, for example, from Anles Ltd, St. Petersburg, Russia.

Preferably, the modifiers are not used or only used in low amounts. Typical amounts include from 0 to 5%, or from 0 to 1.4% by weight based on the total weight of the polymer. Modifiers may be are present, for example, in amounts from about 0.1% to about 1.2% or from about 0.3% to about 0.8% by weight based on the total weight of fluoropolymer.

Although only perfluorinated bisolefinic ethers have been exemplified partially or non-fluorinated homologues may also be used as well as bisolefinic analogues. Combinations of modifiers may also be used.

Optional Non-Fluorinated or Partially Fluorinated Comonomers

The fluoropolymers may contain partially fluorinated or non-fluorinated comonomers and combinations thereof, although this is not preferred. Typical partially fluorinated comonomers include but are not limited to 1,1-difluoroethene (vinylidene fluoride, VDF) and vinyl fluoride (VF) or trifluorochloroethene or trichlorofluoroethene. Examples of non-fluorinated comonomers include but are not limited to ethene and propene. The amounts of units derived from these comonomers include from 0 to 8%, or from 0 to 5, or from 0 to 1% and preferably are 0% (percents by weight based on the weight of the polymer).

Solvents

The fluoropolymer compositions contain at least one solvent. The solvent is capable of dissolving the fluoropolymer. The solvent may be present in an amount of at least 25% by weight based on the total weight of the composition. It may be present in an amount of from about 25 to 99.99% by weight based on the weight of the composition, for example from about 30 to 95% by weight, or from 50 to 90% by weight.

The solvent is a liquid at ambient conditions and typically has a boiling point of greater than 50° C. Preferably, the solvent has a boiling point below 200° C. so that it can be easily removed.

The compositions may contain from about 0.01 to about 55% by weight based on the total weight of the composition of fluoropolymer, or from 0.01 to 45% by weight, or from about 0.1 to about 45% by weight, or from about 10 to 40% by weight based on the weight of the composition. Optimum amounts of solvent and fluoropolymers may depend on the final application and may vary. For example to provide thin coatings, very dilute solutions of fluoropolymer in the solvent may be desired, for example amounts of from 0.01% by weight to 5% by weight. Also for application in spray coating composition of low viscosity may be preferred over solutions with high viscosity. The concentration of fluoropolymer in the solution affects the viscosity and may be adjusted accordingly. An advantage of the present disclosure is that also solutions with high concentrations of fluoropolymer can be prepared that still provide clear liquid composition of low viscosity, for example compositions containing from about 5 to 55% by weight or from 5 to 25% by weight.

The solvent comprises a partially fluorinated ether or a partially fluorinated polyether. The partially fluorinated ether or polyether may be linear, cyclic or branched. Preferably, it is branched. Preferably it comprises a non-fluorinated alkyl group and a perfluorinated alkyl group and more preferably, the perfluorinated alkyl group is branched.

In one embodiment of the present disclosure the partially fluorinated ether or polyether corresponds to the formula:

$$Rf-O-R$$

wherein Rf is a perfluorinated or partially fluorinated alkyl group that may be interrupted once or more than once by an ether oxygen and R is a non-fluorinated or partially fluorinated alkyl group. Typically, Rf may have from 1 to 12 carbon atoms. Rf may be a primary, secondary or tertiary fluorinated or perfluorinated alkyl residue. This means, when Rf is a primary alkyl residue the carbon atom linked to the ether atoms contains two fluorine atoms and is bonded to another carbon atom of the fluorinated or perfluorinated alkyl chain. In such case Rf would correspond to $R_f^1-CF_2-$ and the polyether can be described by the general formula: $R_f^1-CF_2-O-R$.

When Rf is a secondary alkyl residue, the carbon atom linked to the ether atom is also linked to one fluorine atoms and to two carbon atoms of partially and/or perfluorinated alkyl chains and Rf corresponds to $(R_f^2R_f^3)CF-$. The polyether would correspond to $(R_f^2R_f^3)CF-O-R$.

When Rf is a tertiary alkyl residue the carbon atom linked to the ether atom is also linked to three carbon atoms of three partially and/or perfluorinated alkyl chains and Rf corresponds to $(R_f^4R_f^5R_f^6)-C-$. The polyether then corresponds to $(R_f^4R_f^5R_f^6)-C-OR$. $R_f^1$; $R_f^2$; $R_f^3$; $R_f^4$; $R_f^5$; $R_f^6$ correspond to the definition of Rf and are a perfluorinated or partially fluorinated alkyl group that may be interrupted once or more than once by an ether oxygen. They may be linear or branched or cyclic. Also a combination of polyethers may be used and also a combination of primary, secondary and/or tertiary alkyl residues may be used.

In a preferred embodiment of the present disclosure the partially fluorinated ether or polyether corresponds to the formula:

$$C_pF_{2p+1}-O-C_qH_{2q+1}$$

wherein q is an integer from 1 to and 5, for example 1, 2, 3, 4 or 5, and p is an integer from 5 to 11, for example 5, 6, 7, 8, 9, 10 or 11. Preferably, $C_pF_{2p+1}$ is branched. Preferably, $C_pF_{2p+1}$ is branched and q is 1, 2 or 3.

Such solvents are commercially available, for example, under the trade designation NOVEC from 3M Company, St. Paul, USA.

The partially fluorinated ethers and polyethers may be used alone or they may be present in combination with other solvents, which may be fluorochemical solvents or non-fluorochemical solvents.

Additives

Compositions containing curable fluoroelastomers may further contain additives as known in the art. Examples include acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0.5 and 5 parts per 100 parts of fluorinated polymer.

The fluoropolymer composition may contain further additives, such as stabilizers, plasticizers, lubricants, fillers, and processing aids typically utilized in fluoropolymer processing or compounding, provided they have adequate stability for the intended service conditions. A particular example of additives includes carbon particles, like carbon black, graphite, soot. Further additives include but are not limited to pigments, for example iron oxides, titanium dioxides. Other additives include but are not limited to clay, silicon dioxide, barium sulphate, silica, glass fibers, or other additives known and used in the art.

Preparation of the Fluoropolymer Compositions

The fluoropolymer compositions may be prepared by mixing the polymer, the optional curing system and optional additives and the solvent. Preferably, the fluoropolymer is first compounded together with other solid ingredients and in particular with the curing system. Compounding can be carried out in conventional rubber processing equipment to provide a solid mixture, i.e. a solid polymer containing the additional ingredients, also referred to in the art as a "compound". Typical equipment includes rubber mills, internal mixers, such as Banbury mixers, and mixing extruders. During mixing the components and additives are distributed uniformly throughout the resulting fluorinated polymer "compound" or polymer sheets. The compound is then preferably comminuted, for example by cutting it into smaller pieces and is then dissolved in the solvent.

Methods of Making Coatings

Coatings may be prepared by adding the fluoropolymer compositions to a substrate and remove the solvent. In one embodiments coatings can be prepared without curing and the composition may be free of curing agents. In one embodiments coatings can be prepared with curing by actinic irradiation, for example e-beam irradiation and the composition may be free of curing agents. In another embodiment, the composition contains a curable fluoropolymer and one or more curatives. The composition may be subjected to curing after the composition has been applied to the substrate to be coated. Prior to curing the solvent may be reduced or completely removed, for example for evaporation, drying or by boiling it off.

Curing may be achieved by the conditions suitable for the curing system and cure sites used. Depending on the cure sites and curing system used curing may be achieved by heat-treating the curable fluoroelastomer composition or at room temperature, or by irradiation, for example UV-curing or actinic irradiation, for example e-beam curing. The curing is carried out at an effective temperature and effective time to create a cured fluoroelastomer. Optimum conditions can be tested by examining the fluoroelastomer for its mechanical and physical properties. Curing may be carried out under pressure or without pressure in an oven. A post curing cycle at increased temperatures and or pressure may be applied to ensure the curing process is fully completed. Post curing may be carried out at a temperature between 170° C. and 250° C. for a period of 0.1 to 24 hours. The curing conditions depend on the curing system used.

The compositions may be used for impregnating substrates, printing on substrates (for example screen printing), or coating substrates, for example but not limited to spray coating, painting dip coating, roller coating, bar coating, solvent casting, paste coating. Suitable substrates may include any solid surface and may include substrate selected from glass, plastics, composites, metals, metal alloys, wood, paper among others. The coating may be coloured in case the compositions contains pigments, for example titanium dioxides or black fillers like graphite or soot, or it may be colorless in case pigments or black fillers are absent.

Bonding agents and primers may be used to pretreat the surface of the substrate before coating. For example, bonding of the coating to metal surfaces may be improved by applying a bonding agent or primer. Examples include commercial primers or bonding agents, for example those commercially available under the trade designation CHEM-LOK. Articles containing a coating from the compositions provided herein include but are not limited to impregnated textiles, for example protective clothing. Textiles may include woven or non-woven fabrics. Other articles include articles exposed to corrosive environments, for example seals and components of seals and valves used in chemical processing, for example but not limited to components or linings of chemical reactors, molds, chemical processing equipment for example for etching, or valves, pumps and tubings, in particular for corrosive substances or hydrocarbon fuels or solvents; combustion engines, electrodes, fuel transportation, containers for acids and bases and transportation systems for acids and bases, electrical cells, fuel cells, electrolysis cells and articles used in or for etching.

An advantage of the compositions provided herein is that they can be used to prepare coatings of high or low thickness. Another advantage is that more homogenous coatings may be provided allowing for better protection of substrates for example but not limited against corrosion or chemical degradation.

The following examples are provided to further illustrate the present disclosure without any intention to limit the disclosure to the specific examples and embodiments provided.

Methods

I-Content:

The iodine content can be determined by elemental analysis using an ASC-240 S auto sampler from Enviroscience (Düsseldorf/Germany), an Enviroscience AQF-2100 F combustion unit (software:"NSX-2100, version 1.9.8"; Mitsubishi Chemical Analytech Co., LTD.) an Enviroscience GA-210 gas absorption unit and a Metrohm "881 compac IC pro" liquid chromatography analyzer (software: Metrohm "Magic IC Net 2.3").

Glass Transition Temperature (Tg):

The Tg can be measured by differential scanning calometry, for example using a TA Instruments Q200 modulated DSC. Conditions of measurements were: heating rate from −150° C. to 50° C. at 2-3° C./minute. The modulation amplitude was +/−1° C. per minute during 60 sec. Reported is the midpoint Tg (° C.).

Mooney Viscosity:

Mooney viscosities can be determined in accordance with ASTM D1646-07(2012), 1 minute pre-heat and a 10 minute test at 121° C. (ML 1+10 at 121° C.).

Viscosity:

Brookfield viscosities can be measured on Brookfield viscometer LV using spindle 3 at room temperature (20-22° C.).

EXAMPLES

Example 1

In this example a clear coating was prepared.

Firstly, a perfluoroelastomer composition was prepared by mixing 100 parts by weight of a curable perfluoropolymer, under the trade designation PFE40Z (available from 3M Company, St. Paul, Minn., USA) with 0.5 parts by weight of peroxide curative, under the trade designation Trigonox (available from AkzoNobel Functional Chemicals, The Netherlands) and 0.5 parts by weight of coagent (available from e. g. Lehman & Voss).

This compounded formulation was cut into small pieces, approximately 0.5 cm in size. These pieces were added to a beaker of solvent, a partially fluorinated polyether (1,1,1,2, 2,3,4,5,5,5-decafluoro-3-methoxy-4-(trifluoromethyl)-pentane). The solvent was added in a quantity to make up a solution containing 15% by weight of perfluoroelastomer. The beaker was placed on a roller mixer and continuously mixed overnight. The perfluoroelastomer was completely dissolved. The solution had a viscosity of 600 mPas.

The solution was then bar coated onto a part of an aluminium Q panel (obtained from Labomat), 15 cm by 7.5 cm in dimension, and cured in an oven for 5 minutes at 140° C. and for a further post cure for 15 minutes at 200° C.

The aluminium panel was then placed in a beaker of 33% sodium hydroxide solution for 30 minutes and was then removed. No change was seen to the aluminium panel that was coated with the elastomer solution while the uncoated part of the panel corroded and had partially dissolved.

Example 2

In this example a black coating was prepared similar to example 5 but using PFE 7502 BZ, a black perfluoroelastomer compound, commercially available from 3M Company, St. Paul, Minn., USA, instead. This compounded formulation was cut into small pieces, approximately 0.5 cm in size. These pieces were added to a beaker of solvent (3-ethoxy-1,1,1,2,3,4,4,5,5,6,6,6-dodecafluoro-2-trifluoromethyl-hexane). The solvent was added in a quantity to make up a composition containing 10% by weight of perfluoroelastomer compound. The beaker was placed on a roller mixer and continuously agitated over night after which the compound had dissolved and a solution was formed. The viscosity of the resulting formulation was 900 mPas.

The coating composition was then bar coated onto a sheet of aluminum, 15 cm by 7.5 cm in dimension, using a standard bar coater cured in an oven for 5 minutes at 140° C. and optionally for a further post cure for 15 minutes at 200° C. A black coating was obtained.

Comparative Example 1

In this example a clear coating was prepared. A polymer composition was formulated as described in example 1. The compounded formulation was cut into small pieces, approximately 0.5 cm in size. These pieces were added to a beaker of solvent (FC-43, heptacosafluorotributylamine). The solvent was added in a quantity to make up a composition having a perfluoroelastomer content of 15% by weight. The beaker was placed on a roller mixer and continuously mixed overnight. The perfluoroelastomer did not fully dissolve in the solvent.

Comparative Example 2

A polymer composition like comparative example 1 was subjected to a linear partially fluorinated ether ($H_3CH_2C$—O—$(CF_2)_3$—$CF_3$) as solvent analogue to the procedure shown in comparative example 1. The polymer did not fully dissolve.

Example 3

A polymer composition was prepared analog to Example 1 except that 1.5 parts TRIGONOX and 2.5 parts of TAIC were added to 100 parts of perfluoroelastomer (example 3a). Another polymer composition was prepared analog to Example 1 except that 2.5 parts of TAIC were added to 100 parts fluoroelastomer and no TRIGONOX was added. In example 3c only the elastomer was used in 100 parts per weight and no TRIGONOX or TAIC were added. The solutions were coated on a silicone liner and dried for 24 hrs in a cupboard and then heated to 60° C. for one hour in an oven. The obtained coating had a thickness of about 50 microns. The samples were subjected to e-beam curing (10 Mrad, 220 kV) and cured. None of the coatings redissolved in the solvent after being put back into the solvent for 168 hours at room temperature.

The invention claimed is:

1. A composition comprising at least one fluoropolymer dissolved in at least one solvent, wherein the solvent comprises a branched, partially fluorinated ether and wherein the partially fluorinated ether corresponds to the formula:

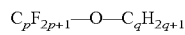

$$C_pF_{2p+1}\text{—O—}C_qH_{2q+1}$$

wherein q is an integer from 1 to 5 and p is an integer from 5 to 11;

and wherein the fluoropolymer is a copolymer comprising at least 90% by weight (based on the total weight of the polymer, which is 100% by weight) of units derived from tetrafluoroethene (TFE) and one or more perfluorinated alkyl ethers corresponding to the general formula

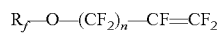

$$R_f\text{—O—}(CF_2)_n\text{—CF}=CF_2$$

wherein n is 1 or 0 and $R_f$ represents a perfluoroalkyl residue or a perfluoroalkyl residue interrupted once or more than once by an oxygen atom.

2. The composition according to claim 1 wherein the solvent is present in an amount of at least 25% by weight based on the total weight of the composition.

3. The composition according to claim 1 wherein the $C_pF_{2p+1}$— unit is branched.

4. The composition according to claim 1 wherein the composition comprises the partially fluorinated ether in an amount of from about 55 to 99.9% by weight based on the weight of the total composition which is 100% by weight.

5. The composition according to claim 1 comprising from 0.01 to 55% by weight of the fluoropolymer based on the weight of the total composition, which is 100% by weight.

6. The composition according to claim 1 wherein the fluoropolymer is a curable elastomer and further comprises units derived from one or more types of cure-site monomers.

7. The composition according to claim 1 wherein the fluoropolymer is a fluoroelastomer and contains one or more cure-sites that are reactive to a peroxide curing system.

8. The composition according to claim 1 wherein the fluoropolymer is a curable fluoroelastomer and contains cure sites derived from one or more cure site monomers wherein the cure sites are selected from cure sites containing nitrile groups, iodine groups, bromine groups and combinations thereof.

9. The composition according to claim 1 wherein the fluoropolymer is a curable perfluoroelastomer and does not contain any repeating units derived from a non-fluorinated or partially fluorinated comonomer but may contain units derived from a perfluorinated, partially or non-fluorinated cure site monomer and or units derived from one or more modifier monomers selected from perfluorinated, partially and non-fluorinated bisolefins, bisolefin-ethers and bisolefin polyethers.

10. The composition according to claim 1 wherein the fluoropolymer is a curable elastomer and further comprises cure sites and wherein the composition further comprises at least one curing agent for curing the fluoroelastomer.

11. The composition according to claim 1 wherein the composition is a coating composition selected from the group consisting of coating compositions for impregnating, spray coating, solvent casting, bar coating, screen printing, 3D-printing, painting, dip coating and roller coating.

12. Method of making the composition of claim 1 comprising dissolving the fluoropolymer in the solvent.

13. The method of claim 12 further comprising adding one or more curing agents suitable for curing the fluoropolymer to the composition wherein the one or more curing agent is added to the fluoropolymer prior, subsequent or simultaneously with dissolving the fluoropolymer in the solvent, and wherein the fluoropolymer is curable.

14. A method of making a coated substrate comprising
(i) applying a composition according to claim 1 to the substrate; and
(ii) removing the solvent.

15. The method of claim 13, further comprising subjecting the composition to curing, wherein the curing step is carried out after, simultaneously with or prior to removing the solvent.

* * * * *